L. A. & A. L. DAVIS.
WAGON SEAT-FASTENING.

No. 186,665. Patented Jan. 30, 1877.

WITNESSES,
H. C. Merrick
P. P. Rogers

INVENTOR
Levi A. Davis
Ambrose L. Davis
By Atty J. C. Robin

UNITED STATES PATENT OFFICE.

LEVI A. DAVIS AND AMBROSE L. DAVIS, OF BINGHAMTON, NEW YORK.

IMPROVEMENT IN WAGON-SEAT FASTENINGS.

Specification forming part of Letters Patent No. 186,665, dated January 30, 1877; application filed September 16, 1876.

*To all whom it may concern:*

Be it known that we, LEVI A. DAVIS and AMBROSE L. DAVIS, of Binghamton, in the county of Broome and State of New York, as joint inventors, have invented a new and useful Improvement in Seat-Fastenings for Vehicles, which improvement is fully set forth in the following specification, reference being had to the accompanying drawings.

This invention relates to that class of seat-fastenings in which a cam and hook are employed; and consists of an open or skeleton cam, and a revolving hook and a socket for the stem of the hook to work in, combined and arranged in such a manner that when the cam is turned the stem of the hook shall move on a line intersecting the axis of the cam and the bearing-point of the hook.

The construction and arrangement of the device will be hereafter fully explained.

Figure 1:
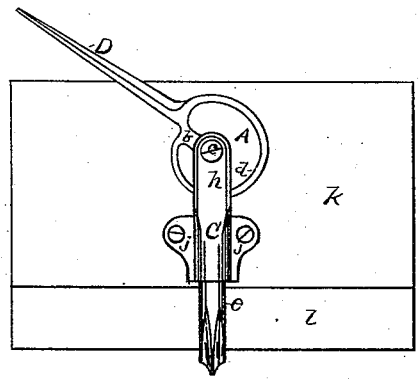
Figure 2:
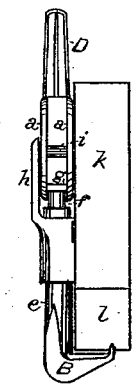
Figure 3:
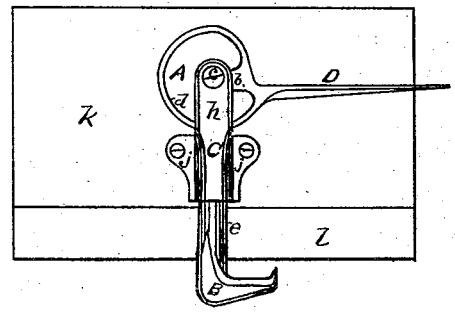
Figure 4:
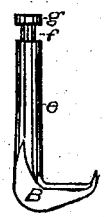

Figure 1, in the accompanying drawings, is a front elevation of a fastening attached to a section of the seat-riser and rail embodying my invention. Fig. 2 is a side view of the same. Fig. 3 is a front view with the point of the hook turned out. Fig. 4 is the hook detached.

A is the cam, which is made in two corresponding parts, $a\ a$, with inside projections $b$ for the axle $c$. The interior bearings $d\ d$ of the cam operate the hook B, the stem $i$ of which is round, and has a groove, $f$, and shoulder $g$ at the end. This shoulder engages with the faces or bearings $d$ of the cam A. C is the socket for the stem $e$ of the hook. This socket has a projection, $h$, for the axle $c$ of the cam, and on each side of said socket are lugs $j\ j$, which have holes for screws for the attachment of the device to the seat. D is the lever or handle of the cam. The interior connection of the cam A with the stem $e$ allows of a more direct action of the parts, and prevents the hook from getting loose by the jar of the vehicle.

When we use our device we attach it to the inside of the seat-riser, with the lever D depressed, so that the point of the hook will drop below the seat-rail $l$. The hook is then turned to its position under the rail, and the lever D elevated and passed a little to the other side of the socket C before the parts are brought to their bearings. This prevents the lever from dropping down and loosening the fastening, as before described.

We are aware that a patent was granted to C. Dixon for improvement on wagon-seat fastenings, dated March 23, 1876, in which a horizontal lever and cam actuates a screw-bolt, on which is pivoted a clamping piece or hook, and secured in its clamping position by a stop piece or projecting shoulder of the same, and to a lug on the base-plate. The horizontal or fastening lever swings on the upper screw end of the bolt, which passes through horizontal lugs in such a manner that when the seat is to be fastened the clamping-hook is turned on the lower end of the screw-bolt until stopped by a shoulder on the pivoted hub, when the clamping-lever is carried over a top lug to secure the fastening, all of which devices we disclaim, and confine our improvements to a simple hook and stem in one piece, operated by an interior vertical cam, the working-faces $d$ of which form an equable spiral, which allows of an extended movement of the hook B and stem $e$, without other adjustments for clamping the various-sized seat-rails, as hereinbefore described.

Having thus described our invention, what we claim as new, and desire to secure by Letters Patent, is—

The cam A, having two open parts, $a$, interior faces $d$, inside projections $b$, and lever D, in combination with clamping-hook B and stem $e$, made in one piece, groove $f$, shoulders $g$, guide-socket C, projection $h$ for axle $i$, all constructed substantially as herein described, for the purpose set forth.

LEVI A. DAVIS.
AMBROSE L. DAVIS.

Witnesses:
P. P. ROGERS,
J. C. ROBIE.